No. 846,747. PATENTED MAR. 12, 1907.
C. V. KERR.
STEAM TURBINE.
APPLICATION FILED NOV. 20, 1905.
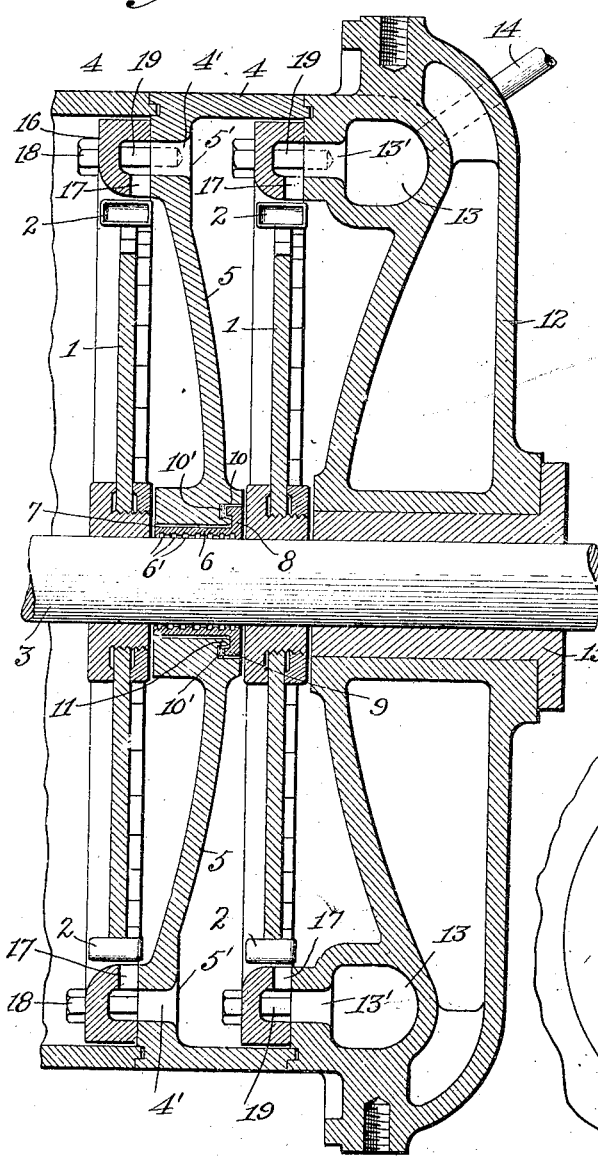
Fig. 1.
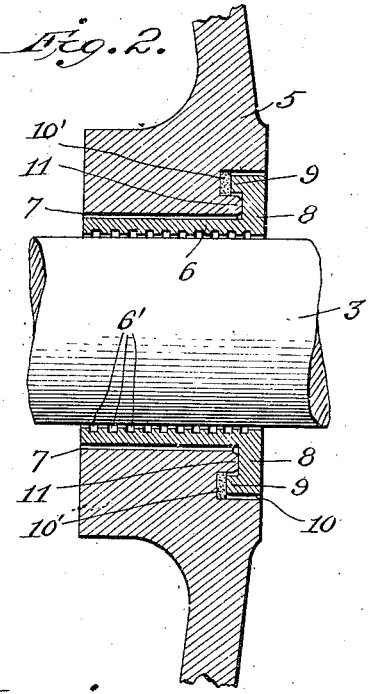
Fig. 2.
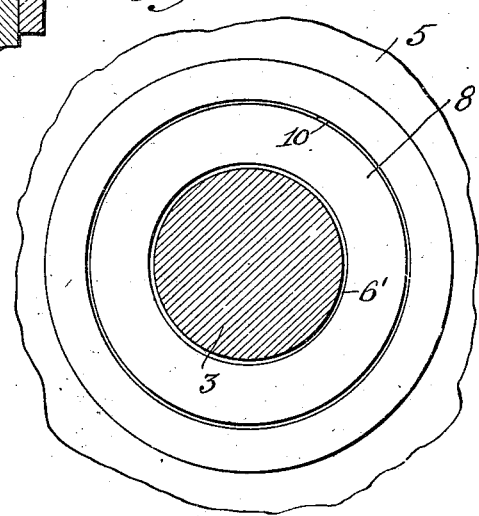
Fig. 3.
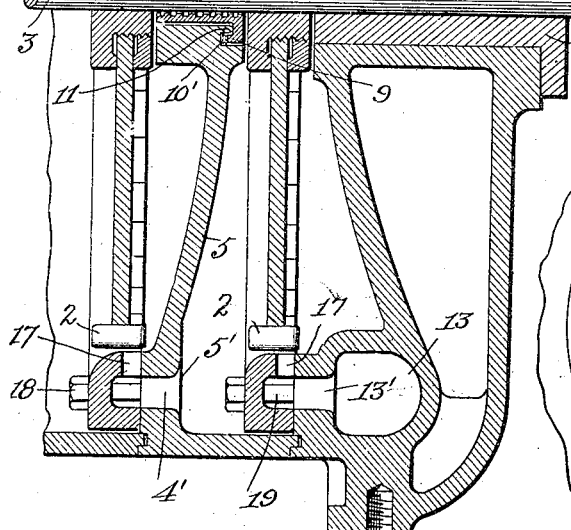
Witnesses
Edwin L. Jewell
Walter Allen
Inventor
Charles V. Kerr
By W. C. Schoenborn
Attorney

UNITED STATES PATENT OFFICE.

CHARLES V. KERR, OF WELLSVILLE, NEW YORK, ASSIGNOR TO KERR TURBINE COMPANY, OF WELLSVILLE, NEW YORK, A CORPORATION OF NEW YORK.

STEAM-TURBINE.

No. 846,747. Specification of Letters Patent. Patented March 12, 1907.

Application filed November 20, 1905. Serial No. 288,233.

*To all whom it may concern:*

Be it known that I, CHARLES V. KERR, a citizen of the United States, residing at Wellsville, in the county of Allegany and State of New York, have invented certain new and useful Improvements in Steam-Turbines, of which the following is a specification.

My invention relates to shaft-packing particularly adapted for compound steam-turbines, known more especially as the "multicellular type," and shown, for example, in my former patents, No. 756,241, dated April 5, 1904, and No. 798,105, dated August 29, 1905.

The objects of my invention are, first, to construct a shaft-packing which forms a combined bushing and bearing for the sections of the shaft passing through the partitions or division-walls forming the chambers for the different stages of expansion, so that the leakage of the motive fluid from one stage of expansion to the next is prevented, and at the same time allow the shaft to rotate practically without touching the bushing and separated therefrom by a film of the motive fluid; second, to so construct and arrange the partitions or division-walls and the bushing that the said bushing is retained to its seat by the differences of motive-fluid pressure and the shaft is lubricated by the water which collects in the grooves in the bushing adjacent to the shaft; third, other evident advantages and features of the specific construction and arrangements of the parts, which will hereinafter appear from the detailed description of the combined bushing and bearing and manner of construction and applying the same.

My invention consists of structural features and relative arrangements of elements, which will be hereinafter more fully and clearly described, and pointed out in the appended claims.

Referring to the one sheet of drawing, Figure 1 is a central longitudinal section of two expansion-chambers of a multicellular type of turbine and showing the construction and arrangement of the combined bushing and bearing about the section of the rotary shaft passing through the partition or division-wall. Fig. 2 is an enlarged sectional view of the combined bushing and bearing and fragments of the shaft and the partition or division-wall, and Fig. 3 is an end and enlarged view of the features as shown in Fig. 2.

In the drawings the same reference characters indicate the same parts throughout the several figures.

Referring to the drawing, 1 1 represent the bucket wheels or disks of the rotor element of the turbine, and 2 2 are the buckets on the periphery of the wheels.

3 is a rotary shaft passing centrally through the turbine-casing, to which the wheels 1 1 are suitably secured.

4 4 are the separable sections of the turbine-casing, which are fitted to each other and the ends of the cylinder by tongue-and-groove joints and held together by longitudinal bolts. (Not shown.) The outside portion of the casing may be provided with the usual lagging, as shown in the former patents hereinbefore referred to.

5 indicates one of the partitions separating one wheel or expansion-chamber from the other and is preferably made integral and connected at one end of its corresponding casing-section 4 by means of any number of webs 5' 5', placed diametrically opposite to each other. The spaces between these webs form extended arcuate-shaped passages 4' for conveying the motive fluid from one section to the next succeeding section or stage of expansion.

The above-described constructions form no essential features of the present invention and may be modified or changed in many ways.

6 is one of my combined bushing and bearings about the shaft 3, which is seated in the central shaft-opening 7 of the partition or division-wall 5 and constitutes the present invention. The bushing or bearing 6 is provided on its inner cylindrical wall or face with a series of rectangular annular grooves 6', which are not provided with a lubricant, but are able to collect such water as may pass along the shaft and by forming eddy-currents provide sufficient resistance for the motive fluid to reduce its leakage to a very small or negligible amount. A sufficient clearance is provided between the shaft and the inner or smaller side of the grooves 6' so that only the shaft will rotate, and the combined bushing and bearing 6 will be held to its seat by the difference of pressure between the expansion-chambers. By this construction and arrangement it has been found that the shaft will rotate practically without touching the bushing and will be separated from it and packed by a filling of the motive fluid, which acts at the same time as a lubricant.

8 is a narrow collar made integral with one end of the bushing 6 and is provided with an annular flange 9, which is seated in a corresponding recess 10, the bottom of which recess may be provided with the usual fibrous material 10' for packing.

11 is a circular ridge forming the inner wall of the recess 10 or the outer edge of the central opening 7 of the partition or division-wall 5. The outer end of this circular ridge 11 is V-shaped in cross-section, so as to present a blunt knife-edge to the bottom face of the circular channel within the inner side of the collar 8, thereby assisting by having a metal-to-metal seat to make a fluid-tight joint between the bushing 6 and division-wall 5 when pressed against said wall by the preponderating fluid-pressure, as above indicated. The bushing 6 is made slightly smaller in its outer diameter than the central opening 7 in the partition 5, so as to provide a clearance in order not to disturb the proper alinement of the axis 3 in its bearings should the centers of the opening 7 in the partitions 5 not exactly correspond with that of the axis of the shaft 3.

12 is a cored casting, which forms the steam end of the cylinder and is provided with a motive-fluid chest 13, provided with any pipe connection 14, leading to a source of motive-fluid pressure, and the arc-shaped openings or ports 13', leading to the first series of nozzle-openings to be hereinafter described.

15 is any suitable bushing surrounding the shaft at the section where it passes through the end casting 12.

16 16 are any suitable nozzle-rings, which are preferably made of bronze or other hard metallic composition, of annular form and U-shaped in cross-section. The inner side or portion of the U-shaped section may be provided with a series of rectangular-shaped passages 17, which form the nozzle-openings for the passage of the motive fluid from one expansion-chamber to the next. The said nozzle-rings are attached by means of bolts 18 18 or other suitable means engaging the webs 5' 5', so that the circular recess or depression 19, formed in the annulus of the U-shaped cross-section, is made to register with the arc-shaped passages 4' in the partition-wall 5 or ports 13', leading from the chest 13. These last-named features form no essential part of my invention, but are described to clearly present the nature of my present invention.

The operation of the invention is as follows: Referring to Fig. 1, the motive fluid passes from the steam-chest 13 through the ports 13' and recess 19 to the passage-ways 17 in the nozzle-ring, striking the buckets 2 on the wheel in such a direction that the velocity of the motive fluid is imparted to the wheel, thereby rotating the shaft 3. The motive fluid in striking the buckets is turned back on itself in a direction almost opposite from that of the original or striking direction, whence it passes into a second chamber, which acts as a motive-fluid chest for the succeeding stage of expansion. The motive fluid again passes through arcuate-shaped ports 4', recess 19, to and through a series of similarly-arranged nozzle-passages 17 17, against another set of buckets, and so on at a lower pressure until the last stage of expansion to the final exhaust, as illustrated and described in the patents referred to above, and need not herein be further described for a clear understanding of the operation and use of the present invention.

As will be seen from the above-described operation of the turbine, the pressure of the motive fluid in one expansion-chamber is higher than that of the next succeeding stage of expansion, and the combined bushing and bearing 6 will be held in their depressions or seats 10, and at the same time the grooves 6' 6' will by the passing of the motive fluid cause eddy-currents to be formed and provide sufficient resistance to reduce the leakage of the said motive fluid from one expansion-chamber to the next to a very small or negligible amount. The water accumulated in the grooves 6' acts as a lubricant as well as support for the shaft in order to reduce its vibration, due to the high rotative speed, to a minimum.

From the foregoing construction, arrangement, and mode of operation of the combined bushing and bearing it will be seen that I have formed a compact, cheap, and durable packing for the sections of a rotary shaft passing through the partitions or divisions of a multicellular type of turbine, as herein shown and described.

Having now fully described my invention, what I claim as new, and desire to secure by Letters Patent, is as follows:

1. A multicellular compound turbine comprising a cylinder composed of separable and independent sections for the several stages of expansion of the motive fluid, a vertical partition or wall within each section and secured thereto, motive-fluid ports through each of the partitions, a central shaft-opening in each of the partitions, an annular recess in one face of each of the partitions and near the central shaft-opening, a bushing having a shaft-opening and seated within each of the central shaft-openings in the partition and of an outside diameter less than that of the shaft-openings, a collar on each of the bushings and having an annular flange adapted to be seated in the annular recess of the partitions, rectangular grooves in the inner side of each of the shaft-openings in the bushings, a rotary shaft passing through the openings in the bushings, a wheel or disk within each chamber formed by the vertical partitions and fixed to the rotary shaft, a row of buckets on the periphery of each wheel or disk and nozzles for conveying the motive fluid to the buckets.

2. A combined bushing and packing for rotary shafts comprising a partition or division-wall, a circular opening in the partition or division-wall, a depression in the partition or wall surrounding the circular opening, an annular recess in one face of the partition or wall and at the outer edge of the depression in the partition or division-wall and forming a circular ridge on the partition or wall adjacent to the circular opening, an annular bushing having a central opening for the passage of the shaft and loosely seated within the circular opening in the partition or division-wall, an annular extension on one end of the bushing having a flange adapted to be inserted into the annular recess of the partition or wall and the outer side of the circular ridge seated against the inner side of the annular extension.

3. A combined bushing and packing for rotary shafts comprising a partition or division-wall, a circular opening in the partition or division-wall, a depression in the partition or wall surrounding the circular opening, an annular recess in one face of the partition or wall and at the outer edge of the depression in the partition or division-wall and forming a circular ridge on the partition or wall adjacent to the circular opening, an annular bushing having a central opening for the passage of the shaft and loosely seated within the circular opening in the partition or division-wall, a series of grooves on the inner surface of the annular bushing, an annular extension on one end of the bushing having a flange adapted to be inserted into the annular recess of the partition or wall and the outer side of the circular ridge seated against the inner side of the annular extension.

4. A shaft-packing for rotary shafts comprising a division-wall, a circular opening in the division-wall, an annular groove in one face of the division-wall surrounding said circular opening, packing within said annular groove, an annular bushing of L-section with central opening for the passage of the shaft and adapted to be seated by difference of pressure on opposite sides of said division-wall upon said packing.

5. A shaft-packing comprising a rotary shaft, an annular bushing of L-section surrounding said shaft, a series of grooves on the inner surface of the annular bushing, a division-wall having an annular groove in one face surrounding said shaft, packing in said groove and means for holding said bushing against said packing.

6. A shaft-packing comprising a rotary shaft, an annular bushing of L-section surrounding said shaft, a division-wall having an annular groove in one face surrounding said shaft, packing in said groove and means for holding said bushing against said packing.

7. A packing for rotary shafts of L-section and comprising an annular bearing 6, an outer narrow collar 8 made integral with and at one end of the annular bearing 6, an annular flange 9 on the end of the collar 8, and a series of grooves 6' on the inner surface of the bearing 6.

In testimony whereof I affix my signature in presence of two witnesses.

CHARLES V. KERR.

Witnesses:
V. R. BRUCE,
WM. D. APPLEBEE.